(12) United States Patent
Kono et al.

(10) Patent No.: US 8,607,620 B2
(45) Date of Patent: Dec. 17, 2013

(54) PREPARATIVE SEPARATION/PURIFICATION SYSTEM

(75) Inventors: Yutaka Kono, Kyoto (JP); Masayuki Nishimura, Kyoto (JP); Bob Boughtflower, Harlow (GB); Przemyslaw Stasica, Stevenage (GB)

(73) Assignee: Shimadzu Corporation, Kyoto (JP)

( * ) Notice: Subject to any disclaimer, the term of this patent is extended or adjusted under 35 U.S.C. 154(b) by 654 days.

(21) Appl. No.: 12/681,276

(22) PCT Filed: Oct. 2, 2007

(86) PCT No.: PCT/JP2007/001070
§ 371 (c)(1),
(2), (4) Date: Jul. 16, 2010

(87) PCT Pub. No.: WO2009/044426
PCT Pub. Date: Apr. 9, 2009

(65) Prior Publication Data
US 2010/0281958 A1  Nov. 11, 2010

(51) Int. Cl.
*G01N 15/04* (2006.01)

(52) U.S. Cl.
USPC ............................................. 73/61.53

(58) Field of Classification Search
USPC ........................................ 73/61.53; 210/96.2
See application file for complete search history.

(56) References Cited

U.S. PATENT DOCUMENTS

2010/0281958 A1  11/2010  Kono et al. ............... 73/61.53

FOREIGN PATENT DOCUMENTS

| JP | 62-019758 A | 1/1987 |
|----|----|----|
| JP | 02-122260 A | 5/1990 |
| JP | 02122260 A | * 5/1990 |
| JP | 2003-149217 A | 5/2003 |
| JP | 2006-349356 A | 12/2006 |
| JP | 2006349356 A | * 12/2006 |

OTHER PUBLICATIONS

United Kingdom Office Action dated Dec. 6, 2011, for the corresponding United Kingdom Patent Application No. 1006547.2.
Final Office Action dated Oct. 13, 2011, issued in co-pending U.S. Appl. No. 13/024,701.
Non-Final Office Action dated Jun. 29, 2011, issued in co-pending U.S. Appl. No. 13/024,701.

* cited by examiner

*Primary Examiner* — Leonard Chang
*Assistant Examiner* — Tamiko Bellamy
(74) *Attorney, Agent, or Firm* — Sughrue Mion, PLLC

(57) ABSTRACT

After a target compound is captured by an adsorbent within a trap column (7) held by a column rack (8) in a substantially vertical position and the column is filled with water to wash its inside, dichloromethane is slowly introduced from an inlet end (7a) on the lower side by a pump (5). The water within the trap column (7) is pushed upward by dichloromethane and exits from an outlet end (7b), to be disposed of via a two-way selector valve (12) and a disposal passage (14). Dichloromethane elutes the captured target compound. Therefore, when the eluate, which initially consists of water, changes via an emulsion to dichloromethane, the eluate contains an adequately high concentration of target compound. At this point, the two-way valve (12) is switched to a preparative separation passage (13). As a result, a solution that is adequately free from water and yet contains the target compound can be collected into a collection container (17), and the target compound in solid forms can be quickly obtained.

6 Claims, 4 Drawing Sheets

PREPARATIVE SEPARATION/PURIFICATION SYSTEM

TECHNICAL FIELD

The present invention relates to a preparative separation/purification system for separately purifying and collecting one or more components individually extracted from a solution by a liquid chromatograph.

BACKGROUND ART

For example, in the pharmaceutical industry, preparative separation/purification systems utilizing liquid chromatographs are used to collect samples of a variety of chemically synthesized compounds in order to store those samples in a library or analyze them in more detail. Conventional examples of the preparative separation/purification system are disclosed in Patent Documents 1 and 2.

In these conventional apparatuses, target components (compounds) in a sample solution are temporally separated by a liquid chromatograph. The separated target components are then respectively introduced into different trap columns and temporarily captured therein. Subsequently, a solvent is supplied into each trap column to quickly elute the component from the trap column and collect it in a container. Thus, a plurality of solutions each containing one target component at a high concentration are respectively collected in a plurality of containers. These separately collected solutions are then subjected to a vaporizing and drying process to remove the solvent and collect the target components in solid forms. The vaporizing and drying process normally includes heating the collected solutions or centrifuging them under a vacuum.

According to the aforementioned conventional method, however, a single vaporizing and drying process requires a long period of time of, for example, several hours to one day. In the pharmaceutical industry, various efforts have been made to improve the efficiency of searching for a large number of synthetic compounds for medicinal compounds; for example, the analysis time has been reduced by using faster analysis apparatuses or optimizing the analytical methods. Reducing the time required for the vaporizing and drying process is a critical issue since this process consumes, within the entire process, the longest period of time.

One reason a long period of time is required to vaporize the solvent from the eluate collected in the previously described manner is the presence of water included in the collected eluate. As the solvent for eluting target components captured in a trap column an organic solvent is often used. As compared to water, organic solvents have much lower boiling points and hence are highly volatile. Therefore, when the target components are dissolved in a pure organic solvent, the vaporizing and drying process requires only a short period of time. On the other hand, if water, which is less volatile, is included in the solvent, the vaporizing and drying process takes a considerably longer period of time.

In the capturing process using the trap column, the target component is introduced into the trap column with the mobile phase of the preparative liquid chromatograph. In many cases, the mobile phase consists of either water or an aqueous solvent containing water as the main component. In these cases, a certain amount of water remains in the trap column at the completion of capturing the target component. This problem also arises in the widely used technique of introducing water into the passage of the mobile phase at a location before the trap column in order to dilute the mobile phase with water and thereby reduce the elution power of the mobile phase so that the target component can be assuredly captured. In this case, the water remains in the trap column at the completion of capturing the target component. Furthermore, after the target component is captured, it is often necessary to wash the trap column by introducing water into it to remove unnecessary components other than the target one, such as the salts originating from the mobile phase, that are present within the trap column. In this case, the mobile phase in the trap column is replaced by water, so that the trap column becomes filled with the water.

For such a variety of reasons, in many cases, the trap column contains a considerable amount of water after the target component is captured. When such a large amount of water is present in the trap column, supplying an organic solvent into the trap column to elute the target component will naturally result in a large amount of remnant water to be included in the solution exiting from the trap column.

Patent Document 1: Japanese Unexamined Patent Application Publication No. H2-122260

Patent Document 2: Japanese Unexamined Patent Application Publication No. 2003-149217

DISCLOSURE OF THE INVENTION

Problem to be Solved by the Invention

The present invention has been developed in view of the previously described problems, and its target is to provide a preparative separation/purification system capable of efficiently obtaining a target component in solid forms by minimizing the amount of water contained in an eluate exiting from the trap column so that the process of vaporizing and drying the eluate can be completed in a short period of time even if a large amount of water remains in the trap column with the target component held therein.

Means for Solving the Problems

The present invention aimed at solving the aforementioned problem is a preparative separation/purification system in which a solution containing a target component is passed through a trap column to capture the target component in the trap column and then a solvent having an elution capability is passed through the trap column to elute the target component from the trap column and collect the target component, which is characterized by including:

a) a column-holding means for holding the trap column so that an internal passage of the trap column vertically extends with an inlet end thereof directed downwards and a discharge end thereof directed upwards; and b) a liquid supply means for supplying a second solvent at a predetermined flow velocity to the inlet end of the trap column, with the target component captured in the trap column held by the column-holding means, the second solvent having a specific gravity greater than the specific gravity of a first solvent remaining in the trap column and having a low solubility to the first solvent, where the first solvent is removed from the trap column by disposing of the first solvent extruded from the discharge end of the trap column by being pushed by the second solvent supplied to the trap column by the liquid supply means.

The first solvent is either a mobile phase used in a liquid chromatograph for separating a target component from a solution containing miscellaneous components, or a cleaning liquid for washing or cleaning the inner passage of the column after the target component is captured in the trap column. Normally, water or an aqueous solvent containing water is used as the main component. For these kinds of solvents, an organic solvent consisting of either dichloromethane (specific gravity: 1.32) or a mixed liquid containing dichloromethane, may be used as the second solvent to satisfy the aforementioned requirements relating to the low solubility and specific gravity. The mixed liquid is a solvent in which, for example, methanol is mixed to control its elution capability or the solubility of the compound.

With a target component being captured by the adsorbent in the trap column held by the column-holding means, and the first solvent being retained in that column, when the second solvent is supplied by the supply means, the second solvent is fed into the trap column from its lower end. Since the first and second solvents have low solubility to each other and the specific gravity of the second solvent is larger than that of the first solvent, the two solvents hardly mix. With the rise in the level of the second solvent within the column, the first solvent is pushed upwards. In this process, the second solvent should be supplied at low velocities since too high a velocity will make the two solvents easily muddled. However, lowering the velocity will deteriorate the displacement efficiency. Accordingly, it is recommendable to perform a preliminary experiment to determine the highest supply velocity that does not cause the muddling of the solvents, and determine the flow velocity of the second solvent based on the experimental value.

The first solvent being pushed upwards with the introduction of the second solvent into the trap column is discharged from the outlet end at the upper end of the column. Eventually, the first solvent is entirely extruded from the trap column, which means that the liquid within the column has been replaced by the second solvent. After this state is achieved, the target component captured in the trap column can be eluted by using the second solvent or another, third solvent, and the eluate can be extracted from the column and collected. Thus, an eluate free from the first solvent, i.e. water, can be collected. For example, if dichloromethane or a mixture thereof is used as the second solvent, the second solvent initially displaces the first solvent from the trap column and subsequently exhibits its strong elution power to elute the target component captured in the trap column. The second solvent is eventually extracted from the trap column and collected.

For this purpose, it is preferable that the preparative separation/purification system according to the present invention further includes:

c) a passage selection means for changing a passage configuration so that a solution exiting from the discharge end of the trap column is selectively sent to either a collection passage leading to a collection container or a disposal passage leading to a disposal port; and d) a control means for controlling the passage selection means so that the first solvent extruded from the discharge end of the trap column by the second solvent is sent to the disposal port according to the action of supplying the second solvent to the trap column by the liquid supply means, while the solution exiting from the discharge end of the trap column with the target component contained therein is sent to the collection passage when the second solvent or a third solvent having a capability of eluting the target component from the trap column is supplied to the trap column.

In this case, it is preferable that the second solvent is a solvent capable of eluting the target component, the first solvent is discharged from the discharge end of the trap column by sending the second solvent to the trap column by the liquid supply means, and an eluate containing the target component is subsequently collected when the second solvent exits from the discharge end.

By this configuration, under the command of the control means, an eluate that is nearly free from the first solvent (e.g. water) and yet contains the target component previously captured in the trap column is assuredly and automatically collected. During the elution of the target component by the second solvent, the two solvents may temporarily coexist when the solvent exiting from the trap column changes from the first solvent to the second. However, by adjusting the timing of changing the passage configuration by the passage selection means, it is possible to select either a mode for preventing the exclusion of the target component to achieve a high level of collection efficiency while allowing some amount of water to be included, or a mode for preventing the mixture of water to improve the solvent purity while allowing the possibility of excluding some amount of the target component.

In one mode of the preparative separation/purification system according to the present invention:

the preparative separation/purification system further includes a calculation means for calculating a period of time required for the first solvent to be completely discharged from the trap column, the period of time being calculated from the internal volume of the trap column and the flow rate of the second solvent supplied by the liquid supply means; and the control means controls the passage selection means so that the eluate exiting from the trap column is sent to the disposal passage at least until the period of time calculated by the calculation means elapses, and the eluate exiting from the trap column is sent to the collection passage after the calculated period of time has elapsed.

In this configuration, the calculation means can be embodied by executing a predetermined program on a central processing unit (CPU), so that it is virtually unnecessary to add any hardware component. Therefore, it is possible to unerringly collect an eluate that is nearly free from water, with a minimal increase in the cost.

In another mode of the preparative separation/purification system according to the present invention:

the preparative separation/purification system further includes a solvent discrimination means for discriminating between the first solvent and the second solvent at a point downstream of the discharge end of the trap column; and the control means controls the passage selection means so that the eluate exiting from the trap column is sent to the disposal passage at least while the first solvent is detected by the solvent discrimination means, and the eluate is subsequently sent to the collection passage after the second solvent begins to be detected by the solvent discrimination means.

The solvent discrimination means may be any type of device capable of discriminating between the solvents based on their physical and/or chemical characteristics. For example, a refractometric detector, electric conductivity detector and absorptiometer are possible choices. In the present configuration, it is possible to change the passage configuration after the first solvent is completely replaced with the second one, so that a water-free eluate is assuredly collected.

According to the purpose of the preparative separation or the amount or kind of the target component, it is desirable, in some cases, to collect a target component with high levels of efficiency while allowing some amount of water to be included into the collected eluate or, in the other cases, to increase the solvent purity while allowing some amount of the target component to be disposed of.

To allow workers (users) to easily make this selection, the preparative separation/purification system according to one preferable mode of the present invention further includes a setting means for externally setting a delay time for initiating the process of collecting a solution into the collection container provided at an end of the collection passage, and the control means delays the timing of switching the passage selection means to the disposal passage by the delay time set through the setting means.

Effect of the Invention

The preparative separation/purification system according to the present invention can remove water and other unwanted residual solvents from the trap column in a short period of time before a target component captured in the trap column is eluted from the column. As a result, an eluate consisting of a small amount of water-free organic solvent with the target component dissolved therein is collected. The solvent in this eluate can be vaporized in a short period of time to obtain the target component in dry, solid forms. Thus, the preparative separation and purification of the target component can be efficiently performed, so that the process throughput is improved.

EXPLANATION OF NUMERALS

1 . . . Solution Container
2 . . . Wash Water Container
3 . . . Eluting Solvent Container
4 . . . Selector Valve
5 . . . Pump
6 . . . Supply Passage
7 . . . Trap Column
7a . . . Inlet End
7b . . . Outlet End
8 . . . Column Rack
10 . . . Discharge Passage
11 . . . Fraction Collector Head
12 . . . Two-Way Selector Valve
13 . . . Preparative Separation Passage
13a . . . Solution Nozzle
14 . . . Disposal Passage
15 . . . Gas Passage
16 . . . On/Off Valve
17 . . . Collection Container
18 . . . Container Rack
19 . . . Heater
20 . . . Temperature Sensor
21 . . . Temperature Regulator
30 . . . Controller
31 . . . Operation Unit

BEST MODE FOR CARRYING OUT THE INVENTION

Figure 1:
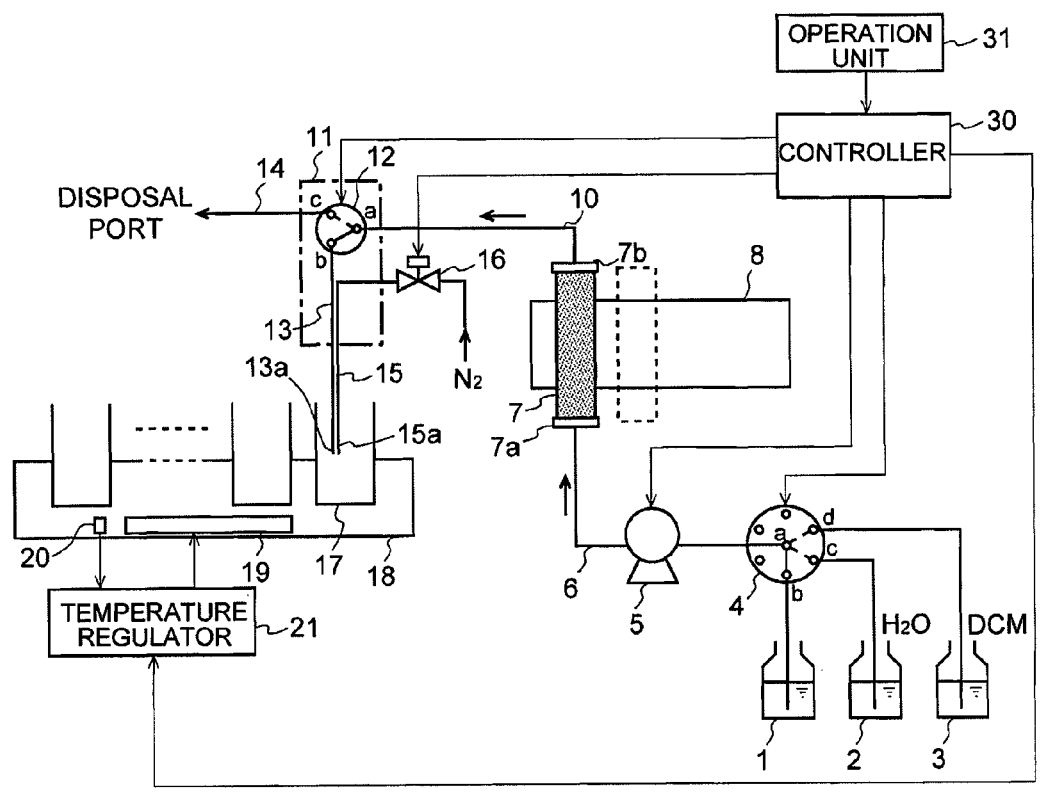
FIG. 1 is a schematic configuration diagram of a preparative separation/purification system according to one embodiment of the present invention.

One embodiment of the preparative separation/purification system according to the present invention is hereinafter described with reference to FIGS. 1 to 5. FIG. 1 is a schematic configuration diagram of the preparative separation/purification system of the present embodiment. The present preparative separation/purification system is designed to obtain a target component in purified, solid forms from a solution containing the target component previously separated by a preparative liquid chromatograph (not shown). Alternatively, it is possible to directly connect the preparative liquid chromatograph to the upstream side of the present system so as to directly introduce a solution containing a target component separated by the preparative liquid chromatograph.

In FIG. 1, a solution container 1 holds a solution that has been separated beforehand as stated earlier. The solvent of this solution, which contains a target compound, is mainly composed of a mobile phase used in the preparative liquid chromatograph. A wash water container 2 holds pure water acting as the first solvent of the present invention, while an eluting solvent container 3 holds dichloromethane (labeled "DCM" in the figure) acting as the second solvent of the present invention. A selector valve 4 is provided to change the passage configuration so that one of the liquids held in these containers 1, 2 and 3 is selectively supplied to a supply passage 6 on which a pump 5 for drawing a liquid at a predetermined flow rate is provided.

A trap column 7 filled with an adsorbent for capturing the target component is held in a substantially vertical position by a column rack 8, which corresponds to the column-holding means of the present invention. The inlet end 7a, to which the aforementioned supply passage 6 is connected, is directed downwards, while the outlet end 7b, to which a discharge passage (to be described later) 10 is connected, is directed upwards. Although FIG. 1 shows only one trap column 7, it is possible to hold two or more trap columns, side by side, as indicated by the dotted line in FIG. 1.

A discharge passage 10 has one end connected to the outlet end 7b of the trap column and the other end to port a of a two-way selector valve 12 embedded in a preparative separation head 11. A preparative separation passage 13 is connected to port b of the selector valve 12, while a disposal passage 14 leading to a disposal port is connected to port c. The two-way selector valve 12 connects either the preparative separation passage 13 or the disposal passage 14 to the discharge passage 10. The other end of the preparative separation passage 13 is a solution nozzle 13a for dripping the supplied solution. A gas ejection nozzle 15a at the end of a gas passage 15 is located close to the solution nozzle 13a. An on/off valve 16 is provided on the gas passage 15. When the on/off valve 16 is opened, a nitrogen gas (or any other inert gas) supplied from a gas cylinder or similar source (not shown) is ejected from the gas ejection nozzle 15a. The solution nozzle 13a and the gas ejection nozzle 15a may have a double-tube structure.

A plurality of collection containers 17 for collecting the separated and purified target compounds are held in a container rack 18. The container rack 18 is provided with a heater 19 and a temperature sensor 20. Based on the temperature monitored with the temperature sensor 20, a temperature regulator 21 regulates the heating current supplied to the heater 19 so that the collection containers 17 can be heated to appropriate temperatures. The preparative separation head 11, which can be moved in both horizontal and vertical directions by a drive mechanism (not shown), is horizontally moved to a position above any one of the collection containers 17 held in the container rack 18 and then vertically lowered to insert the solution nozzle 13a and the gas ejection nozzle 15a into the selected collection container 17 so that a solution can be dripped into the same container.

Instead of moving the preparative separation head 11, it is also possible to move the container rack 18 so that a solution dripped from the solution nozzle 13a will fall into any one of the collection containers 17 held in the container rack 18.

A controller 30 including a central processing unit (CPU) and other components automatically performs a preparative separation/purification task by switching the valves 4 and 12, controlling the operation of the pump 5 (the flow rate or flow velocity), and setting a target temperature for the temperature regulator 21 according to a previously prepared program. An operation unit 31 allows users to enter the conditions and other information relating to the preparative separation/purification task.

Figure 2:
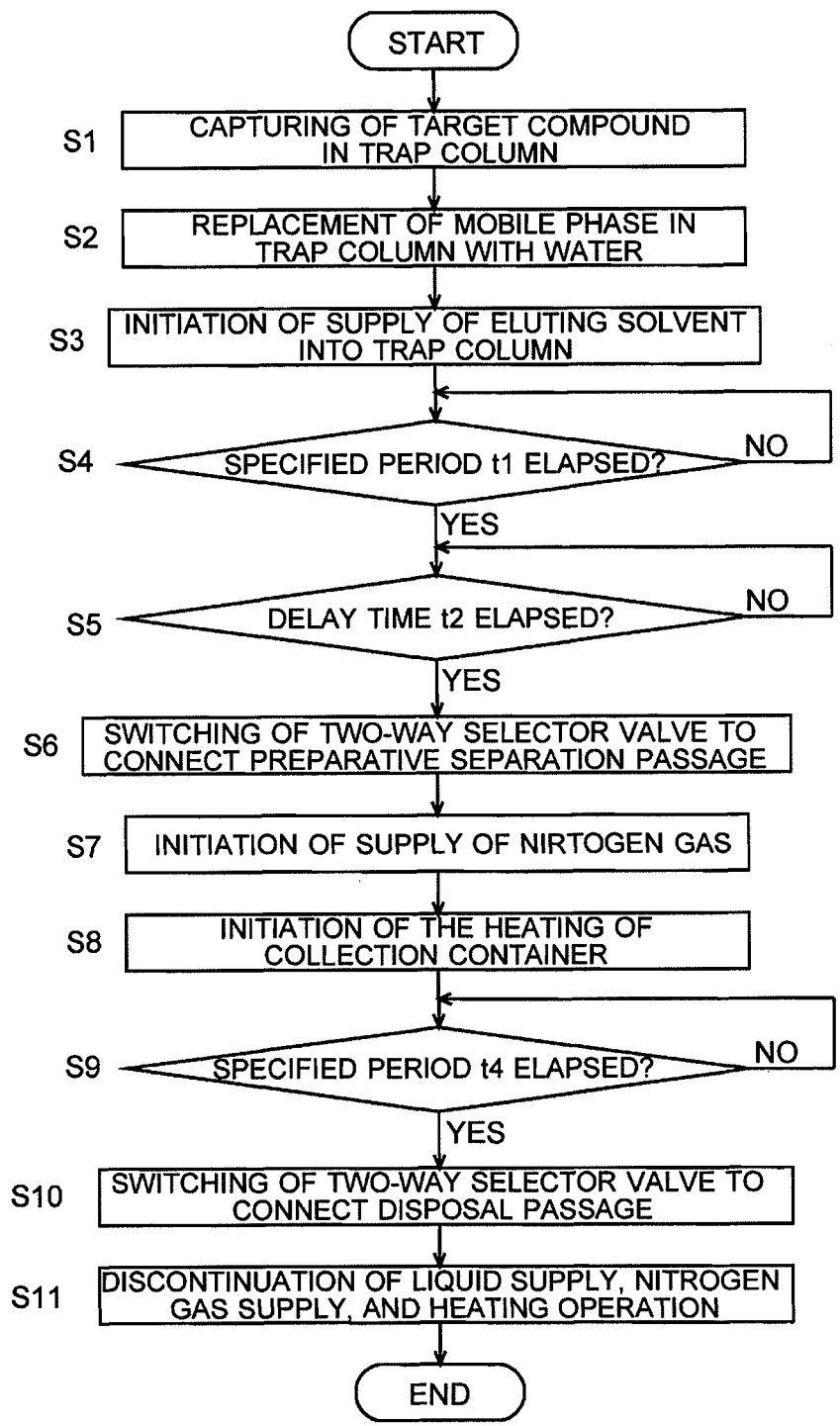
FIG. 2 is a control flowchart for an automatic preparative separation/purification in the preparative separation/purification system of the present embodiment.
Figure 3:
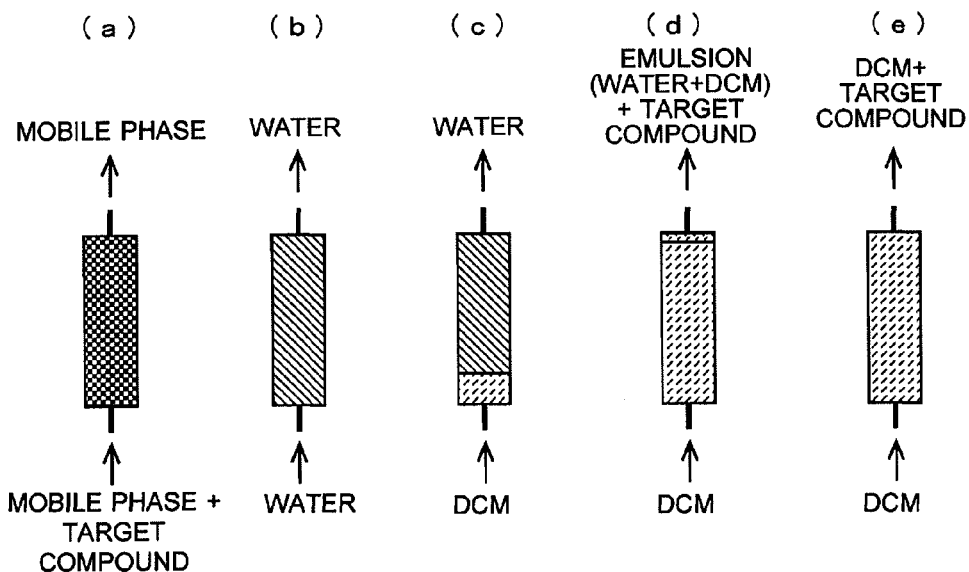
FIG. 3 is a model diagram for explaining how the solvent (liquid) within a trap column changes during the automatic preparative separation/purification operation.
Figure 4:
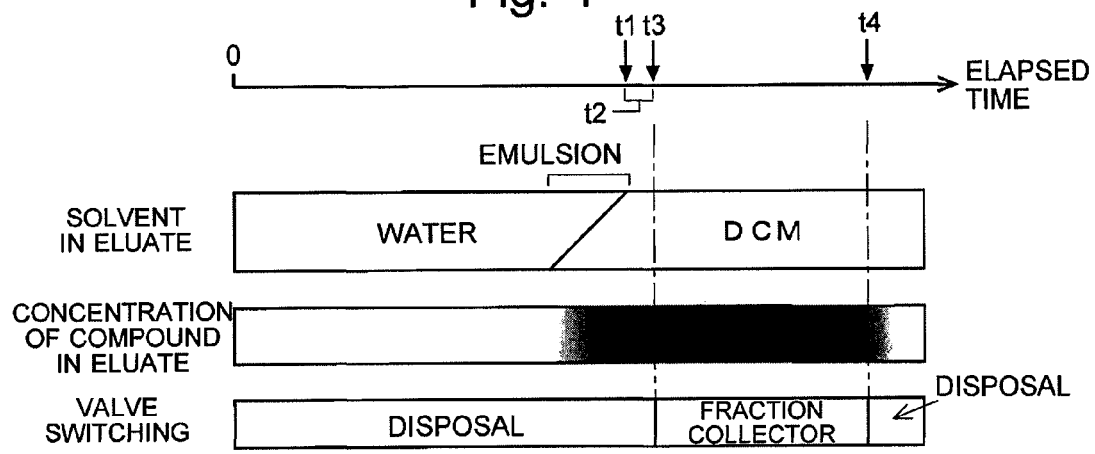
FIG. 4 is an illustration showing how the solvent and target compound in an eluate from the trap column respectively change with time during the automatic preparative separation/purification operation.
Figure 5:
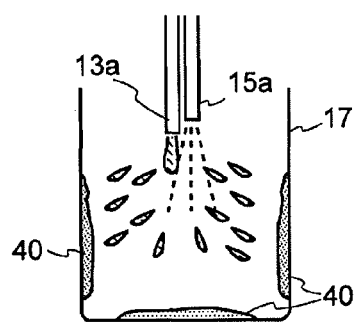
FIG. 5 is a schematic diagram for explaining the process of drying and vaporizing an eluate containing a target component in the preparative separation/purification system of the present embodiment.

An automatic preparative separation/purification operation in the preparative separation/purification system of the present embodiment is hereinafter described with reference to FIGS. 2 to 5. FIG. 2 is a control flowchart for this automatic preparative separation/purification process, FIG. 3 is a model diagram for explaining how the solvent in the trap column 7 changes during the automatic preparative separation/purification operation, FIG. 4 is an illustration showing how the solvent and target compound in an eluate from the trap column 7 change with time during the automatic preparative separation/purification operation, and FIG. 5 is a schematic diagram for explaining the process of drying and vaporizing an eluate containing a target component.

To capture a target compound onto the adsorbent within the trap column 7, the controller 30 initially connects the solution container 1 (port b) and the supply passage 6 (port a) via the selector valve 4 and activates the pump 5 to supply the liquid at a predetermined constant flow rate. The controller 30 also connects the discharge passage 10 (port a) and the disposal passage 14 (port c) via the two-way selector valve 12. The pump 5 draws the solution from the solution container 1 and delivers it through the inlet end 7a into the trap column 7. Then, the target compound in the solution is captured by the adsorbent (Step S1). The mobile phase from which the target compound has been removed exits from the outlet end 7b, to be disposed of via the discharge passage 10 and the disposal passage 14 to the disposal port (refer to FIG. 3(a)).

After the solution is supplied into the trap column 7 for a predetermined period of time or until the solution prepared in the solution container 1 is exhausted, the controller 30 switches the selector valve 4 to connect the wash water container 2 (port c) and the supply passage 6 (port a). Then, the pump 5 draws pure water from the wash water container 2 and delivers it through the inlet end 7a into the trap column 7. By this process, any unwanted water-soluble substance (e.g. a salt) adhered to the adsorbent in the previous process of capturing the target component is removed from the inside of the trap column 7 (Step S2). As a result of supplying the pure water, the mobile phase stored in the trap column 7 immediately before the initiation of the water supply is replaced with water, and this water eventually fills the trap column 7, as shown in FIG. 3(b). The target compound captured on the adsorbent can barely elute into water due to a strong adsorption effect. Therefore, at this point in time, the target compound is still captured in the trap column 7.

Next, the controller 30 switches the selector valve 4 to connect the eluting solvent container 3 (port d) and the supply passage 6 (port a). Then, the pump 5 draws dichloromethane from the eluting solvent container 3 and begins to introduce it through the inlet end 7a into the trap column 7 (Step S3). At this stage, the supply flow rate of the pump 5 is set at a predetermined level lower than in the previous case of supplying the solution or pure water. Dichloromethane has a specific gravity of 1.32, which is larger than that of water, and is not compatible with water. Furthermore, its flow velocity within the trap column 7 is low since, as stated earlier, its supply flow rate is low. Therefore, when dichloromethane is introduced from the inlet end 7a of the trap column 7, it is barely mixes with water present within the trap column 7, as shown in FIG. 3(c), and the interface between dichloromethane and water gradually rises. In other words, dichloromethane gradually accumulates from the bottom of the trap column while pushing water upwards. The pushed water overflows from the outlet end 7b at the upper end of the trap column 7 and flows through the two-way selector valve 12 and the disposal passage 14 and eventually reaches the disposal port.

Although dichloromethane and water are insoluble with each other, they partially form an emulsion. Therefore, as shown in FIG. 3(d), as the interface between water and dichloromethane comes closer to the upper end of the trap column 7, the eluate from the outlet end 7b of the trap column 7 changes from water to an emulsion (solution of dispersion system). Since dichloromethane has a strong elution power, the target compound that is captured by the adsorbent will dissolve in dichloromethane even through it cannot be eluted by water. Accordingly, almost simultaneously with the initial discharging of the emulsion from the trap column 7, the target compound will begin to be contained in the eluate. However, while the eluate is an emulsion, the content of the target compound is relatively low, and its concentration gradually increases.

If an emulsion exiting from the trap column 7 were separately collected for the subsequent stages, it would require a long period of time to vaporize the collected solution since water is included in it. Taking this into account, the controller 30 calculates the period of time t1 required to completely remove water, and repeatedly determines whether the elapsed time from the initiation of the supply of dichloromethane has reached the calculated time t1 (Step S4). This period of time t1 is calculated from the void volume within the trap column 7 (i.e. the volume of water present within the trap column 7 immediately before the introduction of dichloromethane is initiated) and the flow rate of dichloromethane supplied by the pump 5.

Even after the time t1 has elapsed, it is possible that some amount of water remains in the trap column 7 and causes the aforementioned emulsionization of the eluate. Therefore, in many cases, it requires an additional period of time to completely remove water from the trap column 7. Accordingly, the present system defines this additional period of time as the delay time t2 and allows users to set its value through the operation unit 31 in advance of the preparative separation/purification task. After recognizing that the specified time t1 has elapsed from the initiation of the supply of dichloromethane, the controller 30 subsequently determines whether the delay time t2 has elapsed (Step S5). At a point in time t3 where it is determined that the delay time t2 has elapsed, the controller 30 switches the two-way selector valve 12 from the disposal passage 14 to the preparative separation passage 13 to initiate the preparative separation of the target component (Step S6).

Elongating the delay time t2 causes a corresponding increase in the amount of disposal of the eluate exiting from the trap column 7 with the target compound contained therein, and hence a higher percentage of the target compound will be wasted (i.e. not separately collected) among the entire amount captured in the trap column 7. Although the collection rate of the target compound thus decreases, this method can effectively prevent water from being included in the collected eluate, so that the eluate will be more efficiently vaporized and dried. If priority should be given to improving the collection rate of the target compound, the delay time can be shortened to minimize the wasted amount of the target compound while allowing some amount of water to be included in the collected eluate. Thus, users can appropriately set the delay time t2 according to various factors, such as the collection rate of the target compound and the time (or throughput) required to obtain the target compound in solid forms.

The controller 30 switches the two-way selector valve 12 to the preparative separation passage 13 to initiate the preparative separation of the eluate and also opens the on/off valve 16 to initiate the supply of nitrogen gas through the gas supply passage 15 (Step S7). Additionally, the controller 30 specifies a target temperature for the temperature regulator 21 and initiates the heating of the container rack 28 and thereby the heating of the collection containers 17 (Step S8). The target temperature may be approximately equal to or somewhat higher than the boiling point of dichloromethane, i.e. 40 to 45 degrees Celsius. The supply of nitrogen gas and the heating of the collection containers 17 may be initiated before the preparative separation process has been initiated.

The eluate from the trap column 7, i.e. dichloromethane containing the target compound, flows through the preparative separation passage 13 and eventually drips from the solution nozzle 13a. Due to the closely located flow of gas ejected from the gas ejection nozzle 15a, the dripped eluate does not directly fall but is broken into fine droplets and scattered around, as shown in FIG. 5. As stated earlier, the collection containers 17 are heated to a temperature that approximately equals the boiling point of dichloromethane. Therefore, when a fine droplet adheres to the inner circumferential wall or inner bottom wall of the collection container 17, the solvent (i.e. dichloromethane) in the droplet immediately vaporizes, leaving the target compound in solid forms. Thus, the target compound is accumulated on the inner circumferential wall and inner bottom wall of the collection container 17. If water were contained in the eluate, the solvent in the droplet would not immediately vaporize; the eluate would deposit on the bottom of the collection container 17, so that it would require a considerable length of time to obtain the target compound in solid forms. For this reason, it is desirable to initiate the preparative separation process after the water content of the eluate has been decreased to the lowest possible level.

The amount of the target compound captured by the adsorbent in the trap column 7 is limited. Therefore, after a certain period of time has elapsed from the initiation of the introduction of dichloromethane into the trap column 7, the concentration of the target compound in the eluate declines, as shown in FIG. 4. Accordingly, taking into account the internal volume of the trap column 7 (or the amount of adsorbent in the column) and the flow rate of dichloromethane supplied by the pump 5, the controller 30 calculates the period of time t4 required for completely eluting the target compound, and then checks whether the time elapsed from the initiation of the supply of dichloromethane has reached the calculated time t4 (Step S9). When the predetermined period of time t4 has elapsed, the preparative separation process is discontinued by resetting the two-way selector valve 12 to the disposal passage 14 (Step S10). Subsequently, the pump 5 is deactivated, the on/off valve 16 is closed to discontinue the supply of nitrogen gas, and the heating of the container rack 18 is discontinued. Thus, the preparative separation/purification task is halted (Step S11).

If another trap column is ready in the column rack 8 and the preparative separation/purification process using this trap column needs to be subsequently performed, it is only necessary to change the passage configuration by means of a valve (not shown) and repeat the previously described steps.

As described to this point, the preparative separation/purification system according to the present embodiment can efficiently extrude water from a water-filled trap column 7 by introducing dichloromethane as the eluting solvent, after which a water-free eluate can be collected and a target compound in solid forms can be efficiently obtained.

Figure 6:
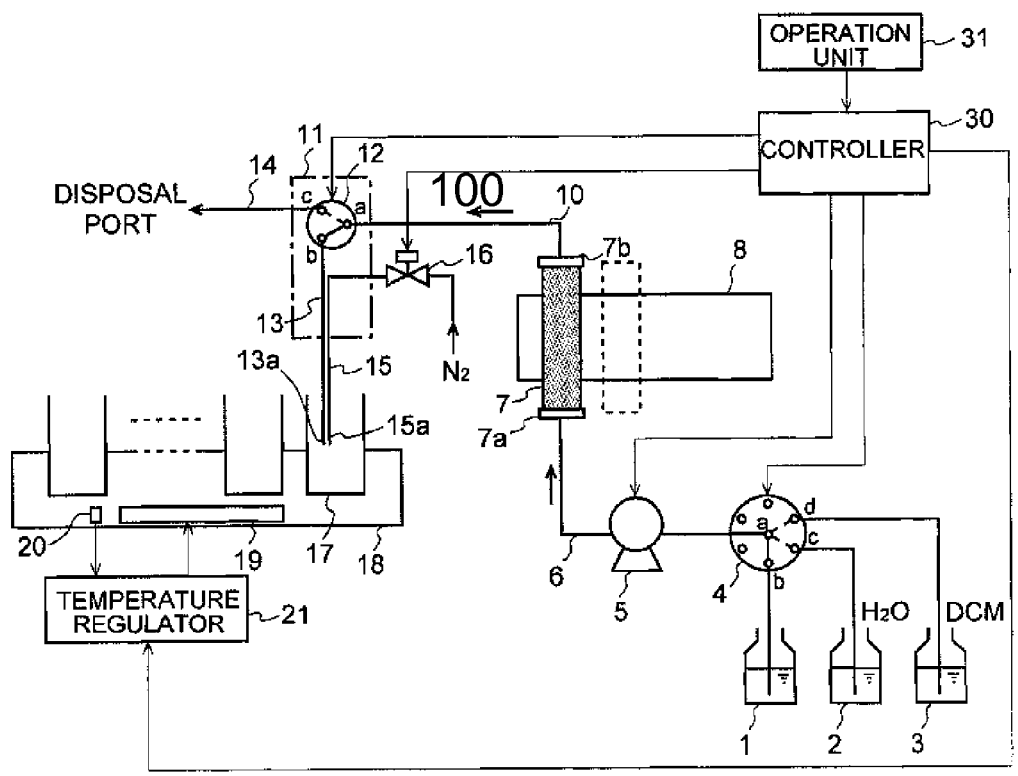
FIG. 6 is another exemplary embodiment in which a detector capable of identifying the kind of solvent is provided.

In the previous embodiment, the timing of switching the two-way selector valve 12 from the disposal passage 14 to the preparative separation passage 13 is determined based on a time measurement. The timing may be determined by another method; that is to say, as shown in FIG. 6, a detector 100 capable of identifying the kind of the solvent contained in a solution flowing through a passage may be provided in the discharge passage 10 extending from the trap column 7 in FIG. 1. This detector 100 may be a refractometric detector, electric conductivity detector, absorptiometer or some other type of detector.

With this detector, the point in time when the eluate from the trap column 7 changes from an emulsion to dichloromethane is determined, and the preparative separation of the eluate containing the target compound is initiated by switching the two-way selector valve 12 from the disposal passage 14 to the preparative separation passage 13 taking account of a delay time corresponding to the volume of the eluate within the passage extending from the detector to the two-way selector valve 12. As in the previous case, it is naturally possible in the present case to set an appropriate delay time taking into account the trade-off between the collection rate of the target compound to be separated and the allowable amount of water to be included in the eluate.

If the amount of the target compound is small and hence the collection rate needs to be higher, it is possible to initiate the preparative separation at a point in time when the eluate changes from water to an emulsion.

It should be noted that the previously described embodiment is a mere example of the present invention; any change, modification or addition appropriately made within the spirit of the present invention will evidently fall within the scope of claims of this patent application. For example, in the previous embodiment, the mobile phase in the trap column was replaced with water, and this water in turn was extruded by dichloromethane. In the case of using water or an aqueous solvent as the mobile phase, dichloromethane can be similarly introduced to extrude the mobile phase from the trap column. The first and second solvents are not limited to water and dichloromethane but may be any kind of solvent that satisfies the previously described requirements.

In the previous embodiment, for ease of explanation, the solutions in the containers 1 to 3 shown in FIG. 1 are all supplied from the inlet end 7a at the lower end of the trap column 7. However, target components are normally captured at an internal portion near the inlet of the trap column 7.

Therefore, in order to assuredly retain and yet efficiently elute target components, it is preferable to supply both the sample solution and water in the direction opposite to the eluting solvent, i.e. from the outlet end 7b to the inlet end 7a. It is evident that this can be achieved by simply adding a passage selector valve.

The invention claimed is:

1. A preparative separation/purification system in which a solution containing a target component is passed through a trap column to capture the target component in the trap column and then a solvent having an elution capability is passed through the trap column to elute the target component from the trap column and collect the target component, which is characterized by comprising:
   a) a column-holding means for holding the trap column so that an internal passage of the trap column vertically extends with an inlet end thereof directed downwards and a discharge end thereof directed upwards; and
   b) a liquid supply means for supplying a second solvent at a predetermined flow velocity to the inlet end of the trap column, with the target component captured in the trap column held by the column-holding means, the second solvent having a specific gravity greater than a specific gravity of a first solvent remaining in the trap column and having a low solubility to the first solvent, where the first solvent is removed from the trap column by disposing of the first solvent extruded from the discharge end of the trap column by being pushed by the second solvent supplied to the trap column by the liquid supply means;
   c) a passage selection means for changing a passage configuration so that a solution exiting from the discharge end of the trap column is selectively sent to either a collection passage leading to a collection container or a disposal passage leading to a disposal port; and
   d) a control means for controlling the passage selection means so that the first solvent extruded from the discharge end of the trap column by the second solvent is sent to the disposal port according to the action of supplying the second solvent to the trap column by the liquid supply means, while the solution exiting from the discharge end of the trap column with the target component contained therein is sent to the collection passage when the second solvent or a third solvent having a capability of eluting the target component from the trap column is supplied to the trap column
   wherein the control means controls the passage selection means so that the eluate exiting from the trap column is sent to the disposal passage at least until a calculated period of time required for the first solvent to be completely discharged from the trap column elapses, and the eluate exiting from the trap column is sent to the collection passage after the calculated period of time has elapsed, the period of time being calculated from an internal volume of the trap column and a flow rate of the second solvent supplied by the liquid supply means.

2. The reparative separation/purification system according to claim 1, which is characterized in that:
   the second solvent is a solvent capable of eluting the target component;
   the first solvent is discharged from the discharge end of the trap column by sending the second solvent to the trap column by the liquid supply means; and
   an eluate containing the target component is subsequently collected when the second solvent exits from the discharge end.

3. The reparative separation/purification system according to claim 1, which is characterized in that:
   the first solvent is water or an aqueous solvent containing water; and
   the second solvent is an organic solvent consisting of either dichloromethane or a mixed liquid containing dichloromethane.

4. A preparative separation/purification system in which a solution containing a target component is passed through a trap column to capture the target component in the trap column and then a solvent having an elution capability is passed through the trap column to elute the target component from the trap column and collect the target component, which is characterized by comprising:
   a) a column-holding means for holding the trap column so that an internal passage of the trap column vertically extends with an inlet end thereof directed downwards and a discharge end thereof directed upwards;
   b) a liquid supply means for supplying a second solvent at a predetermined flow velocity to the inlet end of the trap column, with the target component captured in the trap column held by the column-holding means, the second solvent having a specific gravity greater than a specific gravity of a first solvent remaining in the trap column and having a low solubility to the first solvent, where the first solvent is removed from the trap column by disposing of the first solvent extruded from the discharge end of the trap column by being pushed by the second solvent supplied to the trap column by the liquid supply means;
   c) a passage selection means for changing a passage configuration so that a solution exiting from the discharge end of the trap column is selectively sent to either a collection passage leading to a collection container or a disposal passage leading to a disposal port;
   d) a control means for controlling the passage selection means so that the first solvent extruded from the discharge end of the trap column by the second solvent is sent to the disposal port according to the action of supplying the second solvent to the trap column by the liquid supply means, while the solution exiting from the discharge end of the trap column with the target component contained therein is sent to the collection passage when the second solvent or a third solvent having a capability of eluting the target component from the trap column is supplied to the trap column; and
   a solvent discrimination means for discriminating between the first solvent and the second solvent at a point downstream of the discharge end of the trap column; and
   the control means controls the passage selection means so that the eluate exiting from the trap column is sent to the disposal passage at least while the first solvent is detected by the solvent discrimination means, and the eluate is subsequently sent to the collection passage after the second solvent begins to be detected by the solvent discrimination means.

5. A preparative separation/purification system in which a solution containing a target component is passed through a trap column to capture the target component in the trap column and then a solvent having an elution capability is passed through the trap column to elute the target component from the trap column and collect the target component, which is characterized by comprising:
   a) a column-holding means for holding the trap column so that an internal passage of the trap column vertically extends with an inlet end thereof directed downwards and a discharge end thereof directed upwards;
   b) a liquid supply means for supplying a second solvent at a predetermined flow velocity to the inlet end of the trap column, with the target component captured in the trap column held by the column-holding means, the second solvent having a specific gravity greater than a specific gravity of a first solvent remaining in the trap column and having a low solubility to the first solvent, where the first solvent is removed from the trap column by disposing of the first solvent extruded from the discharge end of the trap column by being pushed by the second solvent supplied to the trap column by the liquid supply means;

c) a passage selection means for changing a passage configuration so that a solution exiting from the discharge end of the trap column is selectively sent to either a collection passage leading to a collection container or a disposal passage leading to a disposal port;

d) a control means for controlling the passage selection means so that the first solvent extruded from the discharge end of the trap column by the second solvent is sent to the disposal port according to the action of supplying the second solvent to the trap column by the liquid supply means, while the solution exiting from the discharge end of the trap column with the target component contained therein is sent to the collection passage when the second solvent or a third solvent having a capability of eluting the target component from the trap column is supplied to the trap column; and a setting means for externally setting a delay time for initiating a process of collecting a solution into the collection container provided at an end of the collection passage; and the control means delays a timing of switching the passage selection means to the disposal passage by the delay time set through the setting means.

6. The reparative separation/purification system according to claim 4, which is characterized in that:

the reparative separation/purification system includes a setting means for externally setting a delay time for initiating a process of collecting a solution into the collection container provided at an end of the collection passage; and the control means delays a timing of switching the passage selection means to the disposal passage by the delay time set through the setting means.

\* \* \* \* \*